United States Patent [19]

Culp

[11] Patent Number: 5,066,084

[45] Date of Patent: Nov. 19, 1991

[54] CONSTANT VELOCITY SCANNING APPARATUS

[75] Inventor: Gordon W. Culp, Van Nuys, Calif.

[73] Assignee: Rockwell International Corporation, El Segundo, Calif.

[21] Appl. No.: 306,351

[22] Filed: Feb. 6, 1989

[51] Int. Cl.$^5$ .............................................. G02B 26/08
[52] U.S. Cl. ................................................. 359/213
[58] Field of Search .................. 350/6.1, 6.5, 6.6, 6.9, 350/6.91, 484, 486, 487; 318/116, 119; 310/311, 321, 328

[56] References Cited

U.S. PATENT DOCUMENTS

| | | | |
|---|---|---|---|
| 4,123,146 | 10/1978 | Dragt | 350/6.5 |
| 4,389,101 | 6/1983 | van Rosmalen | 350/6.5 |
| 4,828,347 | 5/1989 | Keiser | 350/6.6 |

*Primary Examiner*—Bruce Y. Arnold
*Assistant Examiner*—James Phan
*Attorney, Agent, or Firm*—H. Fredrick Hamann; Harry B. Field; Bruce Lutz

[57] ABSTRACT

The present invention relates to an optical scanner of a design whereby mechanical wearing parts are minimized. This is accomplished by using piezoelectric actuators to supply thrust energy to move the reflecting mechanism of the scanner and using a corresponding and cooperating piezoelectric actuator at the other extreme of movement of the reflector to sense the amount of impact for use in calculating the energy to be supplied for a return thrust. The magnitude of energy required is minimized by using contact pads between the scanner and the actuators which effectively operate as short-stroke springs whereby the actuators only need to supply the energy losses in the pads and from windage and bearing friction.

9 Claims, 2 Drawing Sheets

CONSTANT VELOCITY SCANNING APPARATUS

THE INVENTION

The present invention is generally related to optical scanning devices and more specifically is related to a constant velocity scanning device using a reflector such as a mirror and a minimum of movable, mechanical parts that might deteriorate from use and wear or otherwise degrade scanning performance.

BACKGROUND

Present rapidly oscillated optical scanning mirrors relying on mechanical linkages and mechanisms suffer from joint compliance and excessive inertial reaction forces due to masses associated with the scanning mirror. Although the solution, which immediately comes to mind, is to eliminate all masses which are not absolutely necessary to the operation of the scanning mirror, the manner of eliminating these masses is the subject matter of the present inventive concept. In order to achieve a constant angular velocity over a major portion of an oscillatory stroke of a mirror, the mirror must be angularly decelerated, stopped and accelerated in the opposite direction in the smallest practical portion of a scan cycle and be essentially free of external forces in the largest practical portion of a scan cycle. In the concept presented herein, this is effected by an impulse momentum reversal of short stroke springs. The energy losses that occur during the constant velocity portion of the scanning cycle are replaced by piezoelectric actuators or thrust generating means.

An optical scanner with constant velocity linear scanning may find many different uses. The most popular use being in television. While present projectors for very large screen television are presently implemented using electronic scanning, the present invention of mechanically oscillating reflective means could be substituted. Galvanometers are commonly used for beam deflection although here the scan is typically sinusoidal. The ability of the scanner of the present invention to scan through very large angles at a constant velocity greatly increases its usability over prior art devices. In addition, the present inventive concept allows use in a micro G environment where the piezoelectric actuators control the mirror motion in all six degrees of freedom. In such a situation, the energy losses of bearings could be eliminated and the scanning device can provide further improvements over present scanning devices.

It is therefore an object of the present invention to provide an improved optical scanning reflector.

Other objects and advantages of the present invention will be apparent from a reading of the specification and appended claims in conjunction with the drawings wherein:

DETAILED DESCRIPTION

Figure 1:
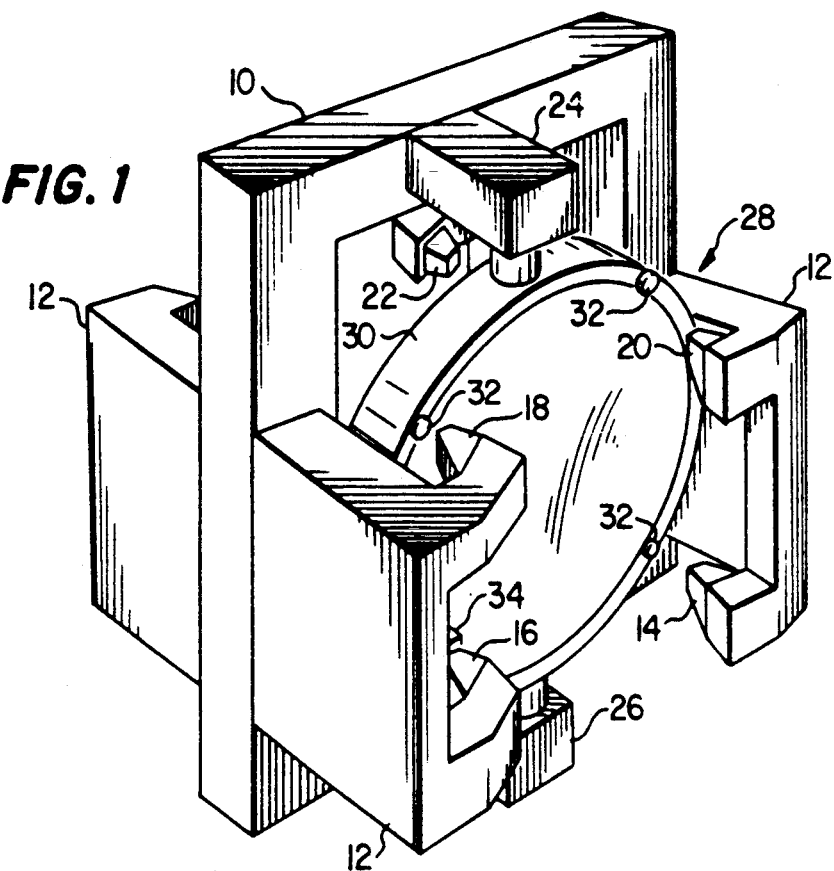
FIG. 1 is a presentation of the mechanical portions of a scanning mirror mounted in a support for use both in normal gravity or microgee gravity applications.

In FIG. 1 a main support frame 10 has additional support members such as 12 upon which are mounted various piezoelectric or other impulse generating devices such as 14, 16, 18, 20 and 22. In the embodiment shown, there are three additional piezoelectric devices which are not illustrated. An additional support member 24 in combination with a support member 26, operate as bearing supports for a mirror or reflecting means generally designated as 28. The mirror or reflecting means 28 comprises an outer frame 30 having a plurality of elastomeric, spring means or bumper means 32 three of which are illustrated. The piezoelectric thrust means 14 through 22 are multiple element devices as will be later illustrated in FIG. 3. Depending upon the use of the device, the bearing support means 24 and 26 may be merely to hold the mirror in a rest position or may provide bearing support in operation. The manner in which these bearings are utilized will depend upon the application and refinement of the software involved in controlling the piezoelectric elements or thrust actuator means. Although not shown in detail, a further device 34 operates to provide an initial kick to the reflecting means to start the scanning motion. This may be any type of initiating device such as a solenoid. It may also be commented here that the most desirable mode of providing the thrust would be from an infinite number of thrust supplying devices applied to the entire surface of the mirror at the appropriate times. This would provide complete minimization of vibrations set up in the mirror device. Such vibrations are often described by physicists as full body impulse vibrations. The minimum practical number of thrust devices for a unit similar to that shown in FIG. 1 would be four and these would be mounted at the midpoint of the mirror between the bearing supports 24 and 26. However, the mirror would, under these conditions of thrust application, require a considerable portion of the scan cycle to settle down to a substantially vibrationless mode for its constant velocity portion of the scan cycle.

Figure 2:
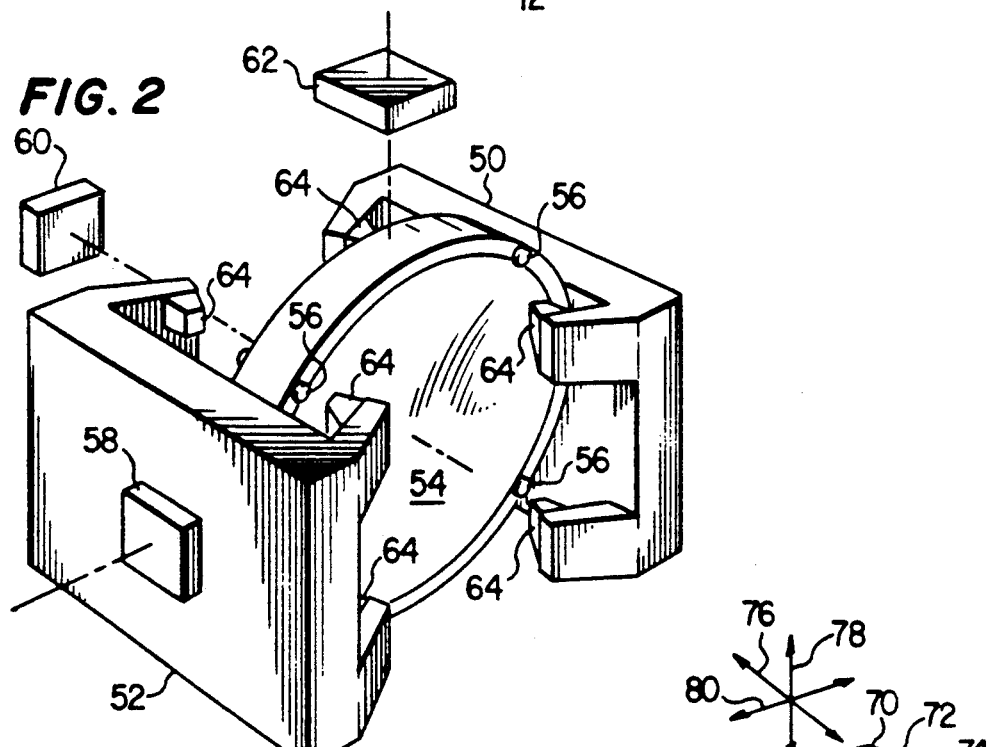
FIG. 2 is a representation of the mechanical portions of a scanning device for use in outer space or, in other words, a microgee environment.

In FIG. 2 a simplified view is illustrated of the scanning device in a free body environment. In such a condition, at least eight thrust application devices are required to provide thrust to the mirror in the six directions of movement so that it will stay between enclosing members 50 and 52. A reflecting means or mirror 54 is shown generally between elements 50 and 52 and again the mirror includes contact means or short stroke spring means 56 as previously indicated in connection with FIG. 1. Markings will occur at appropriate places on the surface of the mirror 54 whereby position detecting means such as 58, 60 and 62 may detect position information in each of the three axes and thus, the six directions of movement of the mirror with respect to the enclosure elements 50 and 52. In a fashion similar to that of FIG. 1, a plurality of piezoelectric thrust devices 64, are shown for making contact with the short stroke spring means 56.

Figure 3:
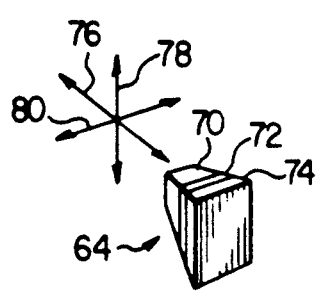
FIG. 3 is a representation of one embodiment of a piezoelectric actuator for use in FIGS. 1 and 2.

In FIG. 3 the piezoelectric element 64 of FIG. 2 is shown in more detail as comprising sections 70, 72 and 74. Portion 70 acts in direction 76 for primary mirror impulse application. Portion 72 acts in direction 78 to impart a velocity component vertically to the mirror 54 while portion 74 operates in direction 80 to impart a velocity laterally to the mirror 54. Each of the portions 70 through 74 are bonded together and to a support such as 50 or 52 of FIG. 2. The portion 70 can comprise sheet-like piezoelectric elements operated in sheer deformation manner. Application of an electrical signal would cause an action in line with direction 76. Alternatively, this element could be designed to deform in thickness or in length. Similar design considerations would apply to elements 72 and 74 to provide the thrust in the desired directions. The thrust supplied by the three portions of actuator 64 are vectorially additive in that the impact surface of portion 70 is affected by both portions 72 and 74.

As is known to those skilled in the art, piezoelectric elements can be used for both imparting energy and detecting energy. Thus, these same elements can be used to supply signals as to the force or magnitude and the direction of impact provided when the mirror is decelerating at the end of its scan cycle after the contact is made between one of the pads 56 and the piezoelectric element 64 of FIG. 2.

Figure 4:
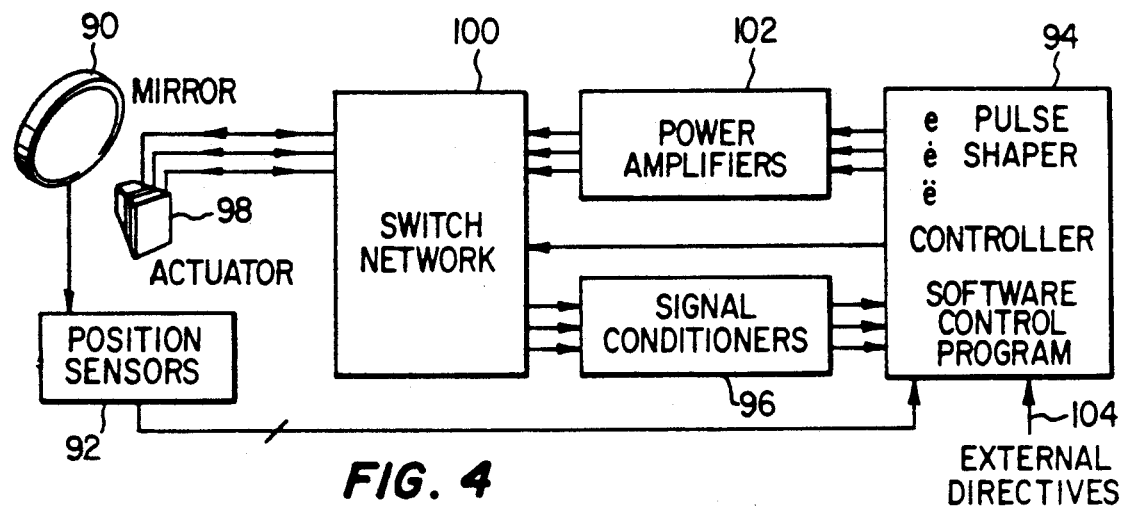
FIG. 4 is an electrical block diagram showing the interconnection of control circuitry for maintaining a constant velocity scanning mirror system.
Figure 5:
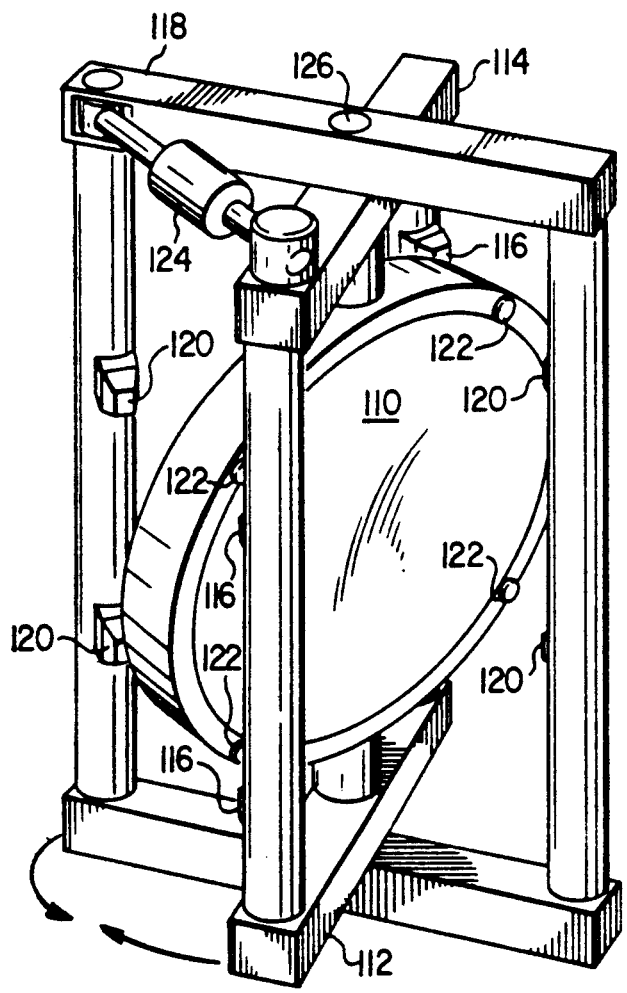
FIG. 5 is a representation of further embodiment of the inventive concept where the distance between the travel extremes of the mirror may be varied and thus, the scan angle may be adjusted.

FIG. 4 illustrates a block schematic diagram of the operation of the devices of FIGS. 1, 2 or 5. A mirror is shown generally as 90 and the position of the mirror is ascertained by one or more position sensors 92 which, in the case of FIG. 2, would be providing position information for each of the three axes. Position sensor 92 would not be necessary if full bearing support were provided as optionally may be the case in the embodiment of FIG. 1. Position sensor 92 supplies signals to a controller block 94 which receives signals from signal conditioning means 96 as received from actuator 98 through a switch network 100. The actuator 98 comprises a plurality of actuator elements as previously described and the switch network operates to supply signals from the actuator to the controller 94 during the deceleration portion of the scan cycle and to supply signals from the controller 94 through the power amplifier block 102 to the appropriate actuators during the acceleration phase of the mirror scan cycle. A lead is shown as 104 and labeled external directives for supplying parameters to the controller 94 as to scan frequency, etc. In the embodiment of FIG. 5, a further external signal might be a scan angle signal supplied to a positioning means 124.

In FIG. 5 a mirror generally designated as 110 is mounted between bearing supports 112 and 114. Columns between the supports 112 and 114 are used to provide support for a plurality of piezoelectric actuators 116. A further set of support means 118 is shown connected to the support elements 114 and 112 and provide a rectangular frame for further piezoelectric actuators 120. The actuators 116 and 120 react with the pads 122 in a manner previously indicated. The primary addition to the embodiment of FIG. 5 is the positioner means 124 which is used to change the angular distance between the thrust means 116 and 120 through the pivotal mounting of the two support frames at a pivotal means 126.

The embodiment of FIG. 5 allows an alteration in the mirror scanning frequency as well as providing for an alteration in the scanned angle. Where only a limited scanning angle is actually required, a high scanning frequency may be obtained while minimizing the thrust required from the actuators by merely reducing the distance between the supports through the use of positioner 124. This will accomplish the desired objectives of increasing the scanning frequency without increasing the velocity of operation. (It may be noted that it is desirable to minimize the amount of thrust so as to minimize the vibration damping requirements).

OPERATION

As previously indicated, the best solution to a mechanical scanning device is one wherein all masses which are not absolutely necessary to the operation of the scanning device are eliminated as well as any movement drag occurring from bearings or windage. In order to accomplish this, the scanning device or mirror must be as nearly as possible a "free body" (no bearings), and if in a free body mode, it must be controlled in all six degrees of freedom. In order to achieve a constant angular velocity over a major portion of the oscillatory stroke of the scanning device, this device must be angularly decelerated, stopped and accelerated in the opposite direction in the shortest practical time. Windage can be minimized by operating the scanning device in a vacuum.

Referring now to the embodiment of FIG. 1 using bearing supports for mirror 28, it will be noted that when the mirror is at a rest condition prior to actuation, that the basic concept cannot start the scanning mechanism unless the energy absorbing and releasing contacts such as 32 are actually in contact with one of the piezoelectric elements 14 through 22. Thus, some means of initiating motion must be used and this is illustrated as a block 34. The initiating mechanism can be any of many sources such as a jet of gas, the application of electrostatic or electromagnetic field, a mechanical impactor or a torsional weak spring which is just sufficient to keep the mirror at one extreme of its rotary position when the unit is not active. Once a first contact between the contacts 32 and their appropriate corresponding actuator such as 14 is achieved, the actuators are fully capable of angularly accelerating the mirror in an ever increasing frequency until the desired scan rate is achieved.

The pads 32 perform a plurality of functions. The pads in the first place protect the reflector mechanism 28 from shock damage upon impact with the piezoelectric elements such as 14 through 22. They prevent the mirror frame 32 from being deformed by these contacts. Further, and more important, the pads 32 perform a function of impulse momentum reversal by compressing upon impact and then expanding to first decelerate the mirror, stop the mirror and then accelerate in the opposite direction with a minimal loss of kinetic energy.

During the deceleration process, the switch 100 of FIG. 4 is in a condition such that the piezoelectric elements such as 20 of FIG. 1 are supplying signals through the signal conditioners 96 to the controller 94 providing information as to the time of the onset of the impact, the intensity thereof and the vector distribution of components of said impact. At approximately the time that the mirror stops moving, the switch network 100 alters internal connections in response to a signal from controller 94 and then signals are supplied from controller 94 through the power amplifiers 102 and the switch 100 to the piezoelectric actuator such as 98 in FIG. 4 to supply energy to appropriate ones of the piezoelectric elements for supplying energy in the appropriate vectorial direction and the appropriate amount to make up for energy losses in the pads 32, windage losses and bearing losses. The energy supply is represented in the drawing of FIG. 4 as a pulse shaper portion of controller 94 wherein slewrate e, voltage acceleration ë and a variable amplitude voltage e are combined in pulse shaping networks to produce the resultant signal applied to actuator 98. If the bearings within the bearing supports 24 and 26 of FIG. 1 are more for initial positioning than true high quality bearings, the piezoelectric elements may additionally be providing further vectorial information to compensate for gravity.

If the mirror 28 is situated in a vacuum so that there are minimal windage losses, and if the bearing supports 24 and 26 are designed such that they are primarily for holding the mirror while in a non-operational condition and during startup, each of the piezoelectric actuators such as 14 must provide the thrust in five of the six possible directions of movement of the mirror to keep the mirror essentially floating between the extremes of potential vertical movement allowed by bearing supports 24 and 26 while continuing the scan motion. In order to achieve this control, position sensors such as 58, 60 and 62 of FIG. 2 need to be incorporated within the mechanism of FIG. 1 and supply the information to the controller 94 as to the position in each of the three axes of movement. In FIG. 4 this portion of the concept is shown by the position sensors block 92 receiving position information from the mirror 90 and supplying it to the controller 94.

The position detecting means such as shown by 58 through 62 of FIG. 2 may be any of many non-contacting lateral position detection means available in the art. One example is U.S. Pat. No. 4,746,217 in the name of Holly which is assigned to the same assignee as the present invention.

Although the preferred practical embodiment would use eight actuators such as shown in the various FIGS. 1, 2 and 5, four actuators could be located on the midplane as long as appropriate bearings were used as illustrated in FIG. 1. The four actuator arrangement would lack sufficient control for all six degrees of mirror motional freedom but would operate satisfactorily in certain applications. It must be realized, however, that as the number of actuators decrease, the likelihood that the mirror will have an extended oscillatory period during which no accurate scanning can be obtained, will increase. The obverse of this would be that an infinite number of actuators would evenly distribute the forces to the mirror and lessen problems of oscillation. In other words, impact caused vibration and mirror distortion decrease as a direct function of the increase in number of actuators evenly distributing the actuating thrusts.

The material used for the pads 32 as well as the material to mount the mirror 14 within the frame 30 is also quite important from a damping standpoint. The damping material for these two portions of the device will definitely affect the fraction of time devoted to constant angular velocity between impacts by quelling vibration whereby changes in mirror optical figure after each impact is either reduced or eliminated.

An alternative electrical embodiment replaces the power amplifiers of FIG. 4 with a segmented source of constant electric potential, and also replaces the pulse shaping network of the controller by components for sinuexponential time calculations. Potential segments, for example, battery cells, are connected in any desired combination to the piezoelectric actuator portions by the switch network at times determined by the controller. Further, piezoelectric portions of an actuator have independently electrically addressable segments (layers), any combination of said piezoelectric segments being switchably connectable to any combination of potential segments, thereby engendering the piecewise approximation of any desired time function of potential. The timing calculations include the sinuexponential variation with time of electric charge transferred to or removed from piezoelectric segments, each segment acting primarily as a capacitor, and due to small values of inherent resistance and inductance of the electrical components and the wiring adjunct thereto. The aforesaid resistance and inductance of practical embodiments of the present invention are small, and therefore cause the sinuexponential behavior. The primary benefit of piecewise signal approximation by switching segmented sources and mainly reactive load segments is fulfilling the function of a linear amplifier without actually using a linear amplifier, while a secondary benefit is that of speed of actuation, said speed always being greater when components are directly connected than when driven by linear amplifiers.

An ideally elastic rebound apparatus such as 56 of FIG. 1 would dissipate negligible energy during scanning, and therefore require the actuator contact surfaces to follow the mirror motion during impact and rebound. A variant of the electrical apparatus comprises separately electrically addressable piezoelectric portions of each actuator to function without interruption during each impact as force sensors, and independently electrically addressable portions of each actuator that are uninterruptedly controlled by said potential sources and potential controlling means, the benefit being the extension of the life of components of the apparatus which are subject to fatigue by reversing stresses by the reduction of the maximum force of impact attained by maintenance of constant deceleration of the mirror after the onset of impact and until zero mirror velocity obtains, caused by imparting a velocity to each piezoelectric actuator which matches the velocity of said mirror upon impact. In like manner, a controlled constant value of acceleration applied to the mirror after direction reversal reduces the maximum force during the rebound portion of each cycle, and essentially zero force when the actuator velocity matches that of the mirror as contact ceases. The spring characteristics of the elastic impact pads are incorporated into the calculation of deceleration and acceleration velocities. This avoids the non-linear force of impact associated with Hertzian, or point-like impact contacts. The free body variant of the present invention requires a vanishingly small quantity of energy for continued scanning, namely, the energy lost through hysteresis of materials in the vicinity of impact and of the apparatus as a whole. The application of constant acceleration and constant deceleration to the scanning member reduces the hysteretic energy loss by reducing the maximum force required, the benefit being an electrically efficient apparatus as well as one with a useful life extended by a reduction of fatigue stresses. Other benefits are acoustically quieter operation and reduced stimulation of unwanted structural vibrations of the mirror that would otherwise obtain under uncontrolled non-linear impact acceleration.

In summary, the present invention is based on the concept of utilizing a substantially free body mirror scanner which after initiation of scanning movement uses piezoelectric actuators to detect time of impact and direction of impact of the mirror with the actuators and then after the scanning body stops, the same actuators are used to impart a force to the mirror in the appropriate direction and at the appropriate magnitude to complete the next half cycle of the scan motion. The scanning mirror approaches the desired objective "constant velocity" as an inverse function the magnitude of various losses such as bearing friction, windage, etc. Where pads such as 56 are used to provide the effect of short stroke springs, deceleration energy is temporarily stored and then utilized to produce part of the forces to return the mirror to its "constant velocity" for the next half cycle of the scan operation. This reduces the energy requirements of the piezoelectric actuators. The signal supplied by controller 94 to the actuators becomes more complex if a version such as FIG. 2 is utilized where the actuators are not only producing the scanning motion but are used effectively to support the mirror against any effects of gravity. Even where the concept is used in a microgee environment in outer space, there will still be some effects of gravity which need to be compensated for. The position detectors 58 through 62 of FIG. 2 or alternatively shown as 92 in FIG. 4 provide the information to the controller 94 for providing this gravity compensating information, any other forces which might alter the relationship of the mirror 54 with respect to its supports will also be taken into account by the sensors and the controller to maintain the mirror in an equilibrium status in its scanning mode.

While I have shown a few embodiments of my concept, I wish to be limited not by the embodiments shown but only by the scope of the appended claims wherein:

I claim:

1. Mirror scanning apparatus comprising, in combination:
   base support means;
   mirror means pivotally attached to said support means for operating in substantially constant velocity scanning cycles between given angular extremes and including indicia for facilitating the detection of pivotal positioning information of the mirror relative said base support means;
   a plurality of combination impact protection means and adjustable direction thrust supplying means for measuring the impact of said mirror means at its travel extreme in a given half of a scan cycle and for supplying an appropriate thrust to said mirror means to return said mirror means to its design velocity for the other half of the scan cycle;
   position detecting means mounted in a stationary position relative said base support for providing position signals indicative of angular position of said mirror means relative said base support means; and
   control means connected to said impact detection means and said position detecting means for receiving position and impact information therefrom and supplying thrust signals to said thrust supplying means to control the movements of said mirror means whereby substantially constant scan velocity of said mirror means is provided over a given range of movement.

2. Mirror scanning apparatus comprising, in combination:
   pivotally mounted mirror means for operating in substantially constant velocity scanning cycles between given angular extremes and including indicia for facilitating the detection of pivotal positioning information of the mirror relative said angular extremes;
   a plurality of combination impact detection means and adjustable direction thrust supplying means for measuring the impact of said mirror means at its travel extreme in a given half of a scan cycle and for supplying an appropriate thrust to said mirror means to return said mirror means to its design velocity for the other half of the scan cycle;
   position detecting means mounted in a stationary position relative said mirror means for providing position signals indicative of angular position of said mirror means; and
   control means connected to said impact detection means and said position detecting means for receiving position and impact information therefrom and supplying thrust signals to said thrust supplying means to control the movements of said mirror means whereby substantially constant scan velocity of said mirror means is provided over a given range of movement.

3. Signal reflective scanning apparatus comprising, in combination:
   pivotally mounted reflector means for operating in substantially constant velocity scanning cycles between given angular extremes and including indicia for facilitating the detection of pivotal positioning information of the reflector means relative said angular extremes;
   a plurality of impact detection means for measuring the impact of said reflector means at its travel extreme in each half of a scan cycle;
   a plurality of thrust supplying means for supplying an appropriate thrust to said reflector means to return said reflector means to its design velocity for a majority of the remainder of each half of the scan cycle;
   position detecting means for providing output position signals indicative of angular position of said reflector means; and
   control means connected to said impact detection means and said position detecting means for receiving position and impact information therefrom and supplying thrust signals to said thrust supplying means to control the movements of said reflector means whereby substantially constant scan velocity of said reflector means is provided over a given range of movement.

4. Signal reflective scanning apparatus comprising, in combination:
   pivotally mounted reflector means for operating in substantially constant velocity scanning cycles between given angular extremes;
   a plurality of impact detection means for measuring the impact of said reflector means at its travel extreme in each half of a scan cycle;
   position detecting means for providing position signals indicative of angular position of said reflective means;
   a plurality of thrust supplying means for supplying thrust of an appropriate magnitude and in an appropriate direction to said reflector means to return said reflector means to its design velocity and angular position for a majority of each half of a scan cycle in response to signals supplied thereto; and
   control means connected to said impact detection means and said position detecting means for receiving position and impact information therefrom and supplying thrust signals to said thrust supplying means to control the direction and velocity of movements of said reflector means whereby substantially constant scan velocity of said reflector means is provided over a given portion of a movement cycle.

5. Signal reflective scanning apparatus comprising, in combination:

pivotally mounted reflector means for operating in substantially constant velocity scanning cycles between given angular extremes;

a plurality of impact detection means for measuring the impact of said reflector means at its travel extreme in each half of a scan cycle;

position detecting means for providing position signals indicative of angular position of said reflective means;

a plurality of pairs of thrust supplying means angularly spaced apart and situated on opposing sides of said reflector means for supplying thrust of an appropriate magnitude and in an appropriate direction to said reflector means to return said reflector means to its design velocity and angular position for a majority of each half of a scan cycle in response to signals supplied thereto;

adjusting means, connected between said pairs of thrust supplying means for adjusting the angular spacing distance between cooperating pairs operating to accelerate said reflector means in opposite directions and thus the angular extremes of operation of said reflector means; and control means connected to said impact detection means and said position detecting means for receiving position and impact information therefrom and supplying thrust signals to said thrust supplying means to control the direction and velocity of movements of said reflector means whereby substantially constant scan velocity of said reflector means is provided over a given portion of a movement cycle.

6. Signal reflective scanning apparatus comprising, in combination:

reflector means for operating in substantially constant velocity scanning cycles between given angular extremes;

impact detection means for measuring the impact of said reflector means at its travel extreme;

position detecting means for providing position signals indicative of angular position of said reflective means;

a plurality of thrust supplying means for supplying thrust to return said reflector means to its design velocity and angular position for a majority of each half of a scan cycle in response to signals supplied thereto; and control means connected to said impact detection means and said position detecting means for receiving position and impact information therefrom and supplying thrust signals to said thrust supplying means to control the direction and velocity of movements of said reflector means whereby substantially constant scan velocity of said reflector means is provided over a given portion of a scan cycle.

7. Optical scanning means comprising, in combination:

support means, including at least 2 pairs of spaced apart variable impulse generating means;

signal reflecting means, pivotally mounted for rotation around a first axis in a limited movement arc whose limits are defined by the spacing of one of said pairs of impulse generating means;

contact detecting means, comprising a part of said support means and connected to said variable impulse generating means, for determining the time between contacts of said reflecting means with said impulse generating means; and control means, connected between said contact detecting means and said impulse generating means for varying the energy content of each impulse provided by said impulse generating means to maintain the time between contacts of said reflecting means with said impulse generating means at a predetermined value.

8. Scanning means comprising, in combination:

spaced apart variable impulse generating means;

signal reflecting means, rotatable around a first axis in a limited movement arc whose limits are defined by the spacing of said impulse generating means;

contact detecting means, comprising a part of said variable impulse generating means, for determining the time between contacts of said reflecting means with said impulse generating means; and control means, connected to said contact detecting means and said impulse generating means for varying the energy content of each impulse provided by said impulse generating means to maintain the time between contacts of said reflecting means with said impulse generating means at a predetermined value.

9. Signal reflective scanning apparatus comprising, in combination:

reflector means for operating in substantially constant velocity scanning cycles between given angular extremes;

impact detection means for measuring parameters relative the impact of said reflector means at its travel extreme;

a plurality of thrust supplying means for supplying thrust to return said re&lector means to its design velocity and angular position for a majority of each half of a scan cycle in response to signals supplied thereto; and control means connected to said impact detection means for receiving impact information therefrom and to said thrust supplying means for supplying thrust signals to control the direction and velocity of movements of said reflector means whereby substantially constant scan velocity of said reflector means is provided over a given portion of a scan cycle.

* * * * *

UNITED STATES PATENT AND TRADEMARK OFFICE
CERTIFICATE OF CORRECTION

PATENT NO. : 5,066,084
DATED : 11-19-91
INVENTOR(S) : Gordon W. Culp

It is certified that error appears in the above-identified patent and that said Letters Patent is hereby corrected as shown below:

Column 7, Line 43:

Delete "protection" and insert --detection--

Column 10, Line 49

Delete "re&lector" and insert --reflector--

Signed and Sealed this

Second Day of March, 1993

Attest:

STEPHEN G. KUNIN

Attesting Officer

Acting Commissioner of Patents and Trademarks